(12) United States Patent
Ishikura et al.

(10) Patent No.: US 10,153,125 B2
(45) Date of Patent: Dec. 11, 2018

(54) IMPULSE VOLTAGE GENERATING DEVICE

(71) Applicant: MITSUBISHI ELECTRIC CORPORATION, Chiyoda-ku, Tokyo (JP)

(72) Inventors: Takahiko Ishikura, Tokyo (JP); Kenichi Mino, Tokyo (JP)

(73) Assignee: MITSUBISHI ELECTRIC CORPORATION, Chiyoda-ku, Tokyo (JP)

( * ) Notice: Subject to any disclaimer, the term of this patent is extended or adjusted under 35 U.S.C. 154(b) by 277 days.

(21) Appl. No.: 15/107,309

(22) PCT Filed: Apr. 1, 2014

(86) PCT No.: PCT/JP2014/059625
§ 371 (c)(1),
(2) Date: Jun. 22, 2016

(87) PCT Pub. No.: WO2015/151228
PCT Pub. Date: Oct. 8, 2015

(65) Prior Publication Data
US 2017/0011879 A1    Jan. 12, 2017

(51) Int. Cl.
*H01J 7/00* (2006.01)
*H03K 3/00* (2006.01)
(Continued)

(52) U.S. Cl.
CPC ............... *H01J 7/00* (2013.01); *H02M 3/04* (2013.01)

(58) Field of Classification Search
CPC ............ H03H 1/00; H03H 7/0115; H03H 2001/0078; H03H 7/0138; H03H 7/1741;
(Continued)

(56) References Cited

U.S. PATENT DOCUMENTS 7,843,087 B2 * 11/2010 Ryoo .................. H03K 3/57
307/106

FOREIGN PATENT DOCUMENTS

JP    57-005217 A    1/1982
JP    58-139678 A    8/1983
(Continued)

OTHER PUBLICATIONS

International Search Report (PCT/ISA/210) dated Jul. 1, 2014, by the Japanese Patent Office as the International Searching Authority for International Application No. PCT/JP2014/059625.

*Primary Examiner* — Wei Chan
(74) *Attorney, Agent, or Firm* — Buchanan Ingersoll & Rooney PC

(57) ABSTRACT

An impulse voltage generating device includes: an insulation cylinder; a DC power source positioned outside the insulation cylinder; capacitors arranged successively and connected to the DC power source in parallel, the capacitors being provided in a plurality of stages, the capacitors being accommodated in metal containers positioned outside the insulation cylinder; a discharging gap switch positioned in the insulation cylinder and provided between the stages; a blower structure configured to cause an insulation gas to flow in the insulation cylinder; a bushing for each of the capacitors, the bushing being positioned outside the insulation cylinder; and a gas spraying structure positioned outside the insulation cylinder, the gas spraying structure being configured to spray the insulation gas to the bushing.

4 Claims, 4 Drawing Sheets

(51) Int. Cl.
  *G06F 11/30*    (2006.01)
  *H02M 3/18*    (2006.01)
  *H02M 3/04*    (2006.01)

(58) Field of Classification Search
  CPC ...... H03H 7/40; H03H 7/075; H01F 27/2823;
    H01F 41/048; H01F 41/0625; H01F
    41/0666; H01F 6/06; H01F 38/14; H01F
    1/24
  USPC ............... 327/124, 76.34; 307/108; 713/194;
    726/26, 34; 324/548, 527, 536, 551, 552,
    324/523, 514, 549
  See application file for complete search history.

(56) References Cited

FOREIGN PATENT DOCUMENTS

JP    60-106376 A    6/1985
JP    7-274539 A    10/1995

* cited by examiner

IMPULSE VOLTAGE GENERATING DEVICE

TECHNICAL FIELD

The present invention relates to an impulse voltage generating device.

BACKGROUND ART

Japanese Patent Laying-Open No. 58-139678 (Patent Document 1) is a prior art document that discloses a configuration of an impulse voltage generating device. In the impulse voltage generating device described in Patent Document 1, decrease in a discharging starting characteristic as caused by humidity is prevented by the following configuration: a discharging gap is provided between stages of capacitors arranged successively and connected to a DC power source in parallel; a discharging bulb in each discharging gap is accommodated in a sealed inner container; the inner container is accommodated in a sealed outer container; and an air flow path for temperature adjustment is formed between both the containers.

CITATION LIST

Patent Document

PTD 1: Japanese Patent Laying-Open No. 58-139678

SUMMARY OF INVENTION

Technical Problem

In the impulse voltage generating device described in Patent Document 1, when an insulation distance from a capacitor needs to be longer as an impulse voltage to be generated becomes higher, the inner container needs to be larger and therefore the outer container also needs to be larger. This results in increase in size of the impulse voltage generating device as a whole.

The present invention has been made in view of the above problem, and has an object to provide an impulse voltage generating device having a reduced size and capable of suppressing a discharging starting characteristic from being decreased by humidity.

Solution to Problem

An impulse voltage generating device according to the present invention includes: an insulation cylinder; a DC power source positioned outside the insulation cylinder; capacitors arranged successively and connected to the DC power source in parallel, the capacitors being provided in a plurality of stages, the capacitors being accommodated in metal containers positioned outside the insulation cylinder; a discharging gap switch positioned in the insulation cylinder and provided between the stages; a blower structure configured to cause an insulation gas to flow in the insulation cylinder; a bushing for each of the capacitors, the bushing being positioned outside the insulation cylinder; and a gas spraying structure positioned outside the insulation cylinder, the gas spraying structure being configured to spray the insulation gas to the bushing.

Advantageous Effects of Invention

According to the present invention, the impulse voltage generating device has a reduced size and is capable of suppressing a discharging starting characteristic from being decreased by humidity.

DESCRIPTION OF EMBODIMENTS

Figure 1:
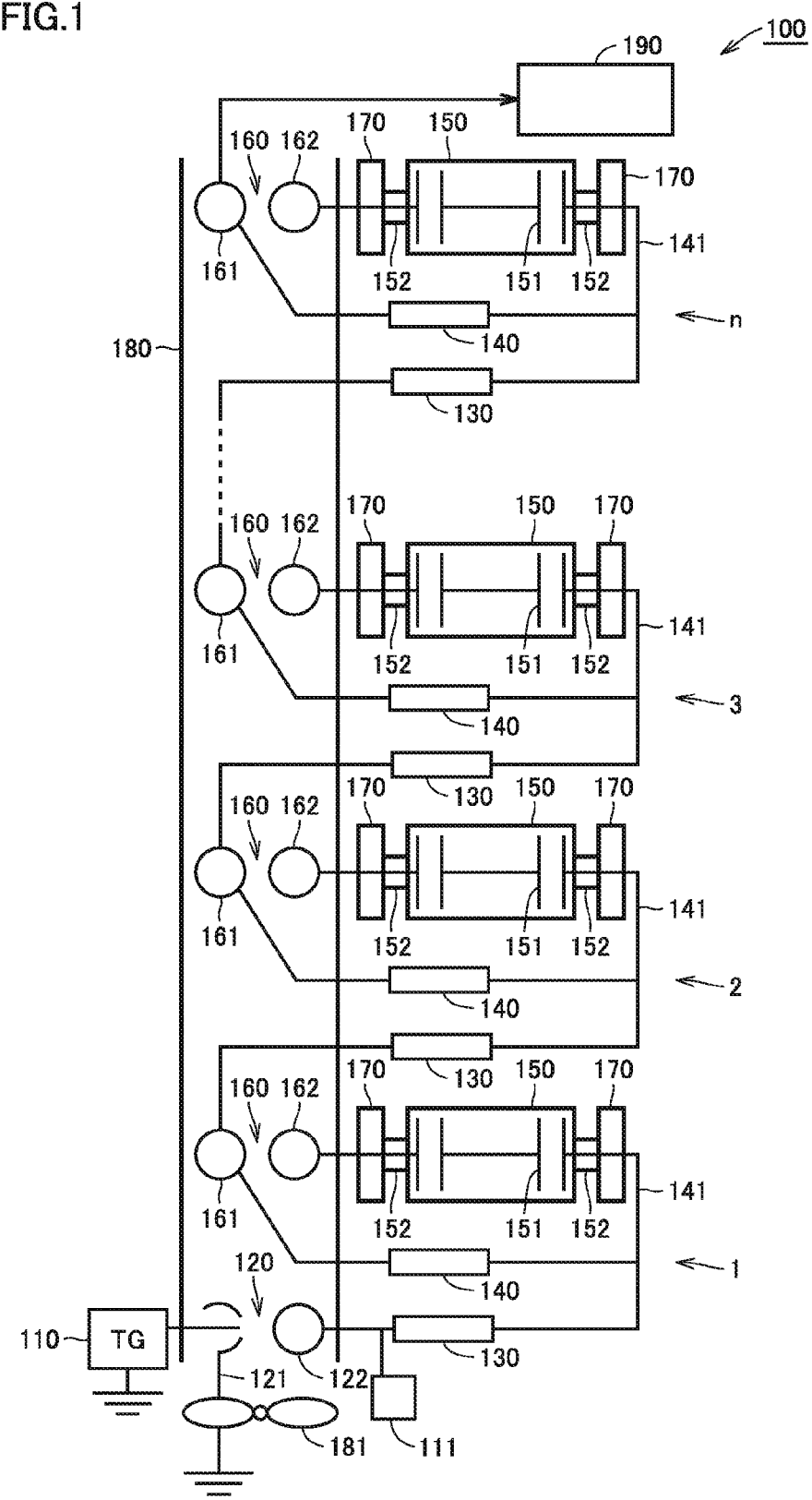
FIG. 1 is a circuit diagram showing a configuration of an impulse voltage generating device according to a first embodiment of the present invention.

The following describes an impulse voltage generating device according to each embodiment of the present invention with reference to figures. In the below-mentioned description of the embodiments, the same or corresponding portions are given the same reference characters and are not described repeatedly.

(First Embodiment)

FIG. 1 is a circuit diagram showing a configuration of an impulse voltage generating device according to a first embodiment of the present invention. FIG. 1 shows respective configurations of the first stage to the n-th stage.

As shown in FIG. 1, impulse voltage generating device 100 according to the first embodiment of the present invention includes: an insulation cylinder 180; a DC power source 111 positioned outside insulation cylinder 180; capacitors 151 arranged successively and connected to DC power source 111 in parallel, capacitors 151 being provided in a plurality of stages, capacitors 151 being accommodated in metal containers 150 positioned outside insulation cylinder 180; a discharging gap switch 160 positioned in insulation cylinder 180 and provided between the stages; a blower structure 181 configured to cause an insulation gas to flow in insulation cylinder 180; a bushing 152 for each of capacitors 151, bushing 152 being positioned outside insulation cylinder 180; and a gas spraying structure 170 positioned outside insulation cylinder 180, gas spraying structure 170 being configured to spray the insulation gas to bushing 152.

In each of the stages, a series resistor 130 electrically connected to capacitor 151 in series, a parallel resistor 140 electrically connected to capacitor 151 in parallel, and bushing 152 for capacitor 151 are electrically connected to one another by a connection conductor 141.

A series resistor 130 of the first stage is electrically connected to DC power source 111 and a discharging bulb 122 of a starting gap switch 120. Starting bulb 121 of starting gap switch 120 is connected to a bar-like trigger electrode 110. Starting gap switch 120 is positioned within insulation cylinder 180.

Discharging gap switch 160 includes: a discharging bulb 161 provided between a parallel resistor 140 at a lower stage side and a series resistor 130 at an upper stage side; and a discharging bulb 162 electrically connected to a bushing 152 for capacitor 151 at the lower stage side. A discharging bulb 161 electrically connected to a series resistor 130 of the n-th stage is electrically connected to a test specimen 190 when discharging gap switch 160 is turned on.

Insulation cylinder 180 is a cylinder made of a material having an electric insulation property. in the present embodiment, insulation cylinder 180 is a cylinder made of FRP (Fiber Reinforced Plastics) containing an epoxy resin; however, the material of insulation cylinder 180 is not limited to this and may be any material having electric insulation property and weather resistance.

In the present embodiment, metal container 150 is a container made of iron and steel; however, the material of metal container 150 is not limited to this and metal container 150 may be a container made of copper or aluminum, for example.

In the present embodiment, the insulating gas is dry air; however, the insulating gas is not limited to this and may be nitrogen gas or the like, for example.

In the present embodiment, blower structure 181 includes: a fan; a dehumidification unit configured to dehumidify air; and a heating unit configured to heat the air. Blower structure 181 supplies insulation cylinder 180 with dry air having constant humidity and temperature provided by the dehumidification unit and the heating unit.

Bushing 152 for capacitor 151 includes: a cylindrical insulator; and an inner conductor positioned on the center axis of the insulator. The inner conductor is connected to connection conductor 141.

In the present embodiment, the insulator is constituted of a porcelain insulator; however, the material of the insulator is not limited to this and may be any material having insulating property and weather resistance. The inner conductor is made of copper; however, the material of the inner conductor is not limited to this and may be aluminum or the like, for example. Connection conductor 141 is made of copper; however, the material of connection conductor 141 is not limited to this and may be aluminum or the like, for example.

The following describes gas spraying structure 170 in impulse voltage generating device 100 according to the present embodiment in detail. It should be noted that the description below is directed to gas spraying structure 170 attached to one of two bushings 152 for capacitor 151, but the same applies to the configuration of gas spraying structure 170 attached to the other bushing 152.

Figure 2:
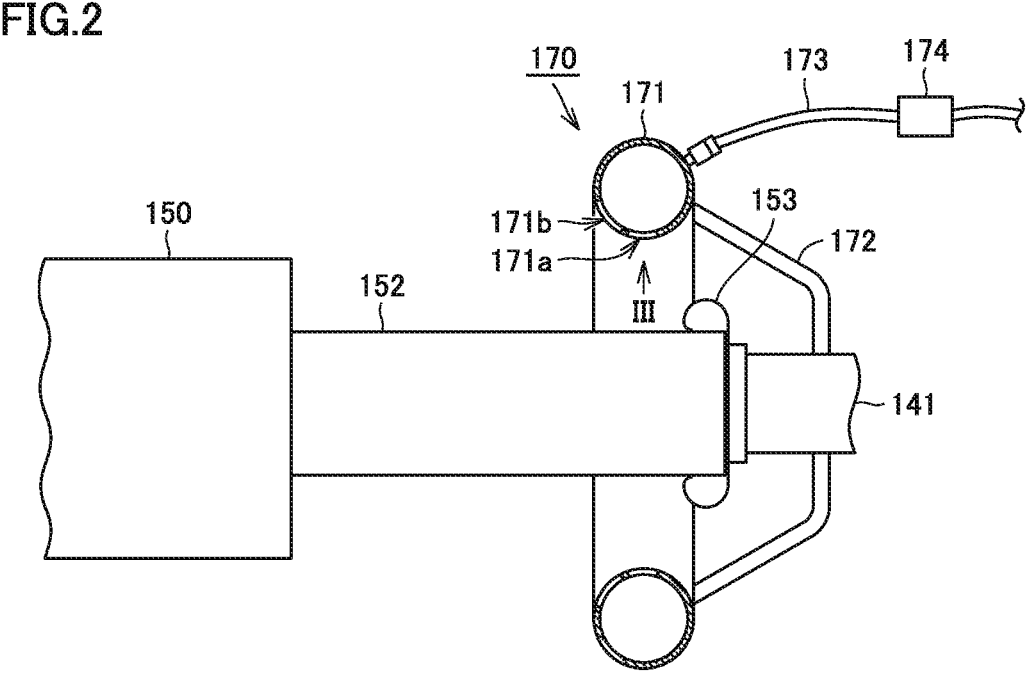
FIG. 2 is a partial cross sectional view showing a configuration of a gas spraying structure in the impulse voltage generating device according to the first embodiment of the present invention.
Figure 3:
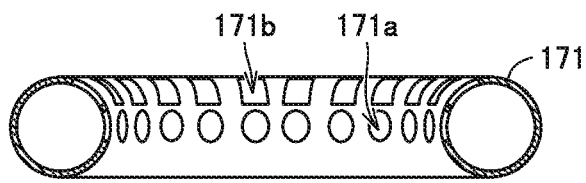
FIG. 3 shows the gas spraying structure of FIG. 2 when viewed in a direction of arrow III.

FIG. 2 is a partial cross sectional view showing the configuration of the gas spraying structure in the impulse voltage generating device according to the present embodiment. FIG. 3 shows the gas spraying structure of FIG. 2 when viewed in a direction of arrow III. In FIG. 2, only a gas spraying unit 171 described below is shown in a cross section.

As shown in FIG. 2, in impulse voltage generating device 100 according to the present embodiment, an electric field relaxation shield 153 is attached to a tip portion of bushing 152. Gas spraying structure 170 includes annular gas spraying unit 171. Gas spraying unit 171 is positioned to surround the circumference of the tip portion of bushing 152.

Specifically, gas spraying unit 171 made of a metal is supported by a supporting unit 172 that is fixed to connection conductor 141 and that has electric conductivity. Gas spraying unit 171 is supported such that a space between the external shape of bushing 152 in the radial direction of bushing 152 and the inner shape of gas spraying unit 171 is uniform across the entire circumference of bushing 152.

An insulation pipe 173 for supplying the insulation gas is connected to gas spraying unit 171. The insulation gas is supplied at a flow rate controlled by a mass-flow controller (not shown) connected to insulation pipe 173. In the present embodiment, a heating unit 174 for heating the insulation gas is provided at a portion of insulation pipe 173. However, heating unit 174 does not necessarily need to be provided.

As shown in FIG. 2 and FIG. 3, gas spraying unit 171 has a plurality of gas spraying openings provided across the entire inner circumference of gas spraying unit 171. Specifically, gas spraying unit 171 includes: a plurality of first gas spraying openings 171a each for spraying the insulation gas in a direction orthogonal to the outer circumference of bushing 152; and a plurality of second gas spraying openings 171b each for spraying the insulation gas in a direction oblique to the outer circumference of bushing 152.

In the present embodiment, each of first gas spraying openings 171a has a circular shape, and each of second gas spraying openings 171b has a quadrangular shape. It should be noted that the respective shapes of first and second gas spraying openings 171a, 171b are not limited to these and may be any shapes with which the insulation gas can be sprayed from first gas spraying openings 171a and second gas spraying openings 171b to the entire outer circumference of bushing 152.

Because impulse voltage generating device 100 according to the present embodiment includes gas spraying structure 170, the discharging starting characteristic can be suppressed from being decreased by humidity. The following describes a reason of this.

Figure 4:
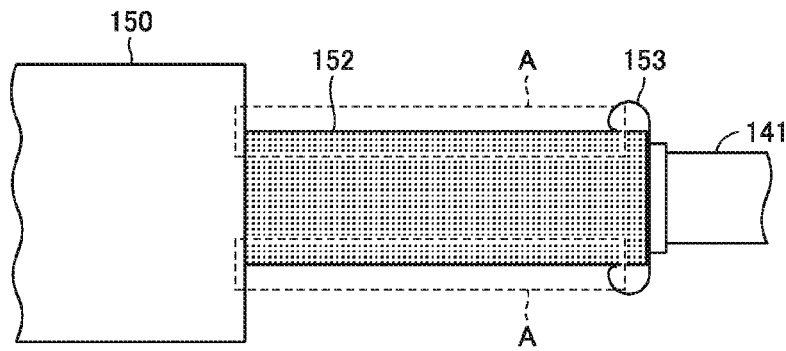
FIG. 4 shows that dew is formed on an outer surface of a bushing for a capacitor in the impulse voltage generating device.

FIG. 4 shows that dew is formed on the outer surface of the bushing of the capacitor in the impulse voltage generating device. As shown in FIG. 4, when temperature and humidity are high around the impulse voltage generating device, dew may be formed on the outer surface of bushing 152. If the impulse voltage generating device is charged with power in this state, inappropriate external discharging may occur, due to the formed dew, at a creepage surface portion A of bushing 152 shown in FIG. 4 before reaching a desired discharging starting voltage, for example. In this case, bushing 152 is short-circuited to start discharging of the impulse voltage generating device, thus resulting in a decreased discharging starting characteristic of the impulse voltage generating device.

In impulse voltage generating device 100 according to the present embodiment, gas spraying structure 170 is operated before starting to charge impulse voltage generating device 100 with power. Specifically, the dry air heated as a result of passing through heating unit 174 is sprayed from first and second gas spraying openings 171a, 171b of gas spraying unit 171 to the entire outer circumference of bushing 152. Accordingly, the dew formed on the outer surface of bushing 152 is evaporated.

After evaporating the dew formed on the outer surface of bushing 152, impulse voltage generating device 100 starts to be charged while continuing to operate gas spraying structure 170. The operation of gas spraying structure 170 is continued until impulse voltage generating device 100 generates a desired impulse voltage. By operating gas spraying structure 170 in this way, inappropriate external discharging can be prevented from occurring due to the dew formed on the outer surface of bushing 152. Likewise, in impulse voltage generating device 100, before starting the charging, blower structure 181 is operated continuously until a desired impulse voltage is generated. Because blower structure 181 is operated, dry air having constant humidity and temperature is caused to flow in insulation cylinder 180, thereby evaporating dew formed in insulation cylinder 180. By operating blower structure 181 in this way, starting gap switch 120 and discharging gap switch 160 can be prevented from being turned on unintentionally due to inappropriate discharging resulting from the dew formed in insulation cylinder 180.

In impulse voltage generating device 100 according to the present embodiment, by operating blower structure 181 and gas spraying structure 170 as described above, the discharging starting characteristic can be suppressed from being decreased by the humidity in impulse voltage generating device 100.

It should be noted that even if dew is formed on the outer surface of metal container 150 having capacitor 151 accommodated therein, substantially no electric potential difference is caused within the outer surface of metal container 150 due to the electric conductivity of metal container 150, whereby inappropriate external discharging does not occur at the outer surface of metal container 150.

In impulse voltage generating device 100 according to the present embodiment, by using insulation cylinder 180, blower structure 181, and gas spraying structure 170, the insulation gas can be sprayed effectively to a portion at which inappropriate discharging may occur due to formed dew. Accordingly, two containers do not need to be employed to accommodate the portion at which inappropriate discharging may occur due to formed dew and a flow path for insulation gas does not need to be secured. This leads to size reduction of impulse voltage generating device 100.

In impulse voltage generating device 100 according to the present embodiment, the insulation gas heated by heating unit 174 is sprayed to the outer surface of bushing 152. Hence, as compared with a case where insulation gas not heated is sprayed to the outer surface of bushing 152, it is possible to reduce time and amount of insulation gas both required to evaporate dew formed on the outer surface of bushing 152.

Hereinafter, an impulse voltage generating device according to a second embodiment of the present invention will be described. It should be noted that an impulse voltage generating device 200 according to the present embodiment is different from impulse voltage generating device 100 according to the first embodiment only in that impulse voltage generating device 200 further includes a suctioning structure 270. Hence, the other configurations will not be described repeatedly.

(Second Embodiment)

Figure 5:
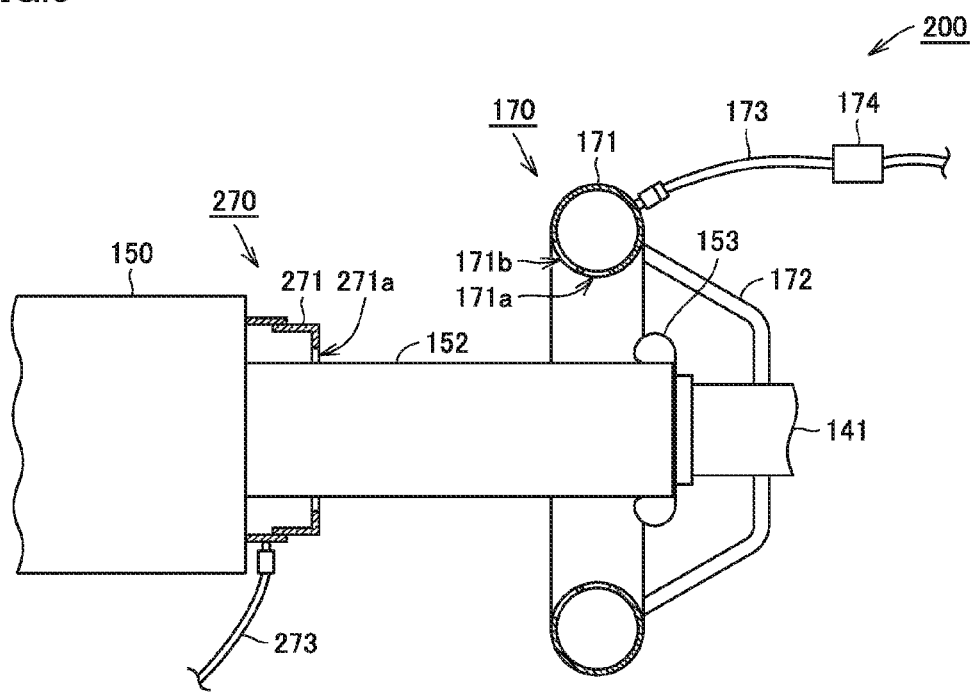
FIG. 5 is a partial cross sectional view showing a configuration of a gas spraying structure in an impulse voltage generating device according to a second embodiment of the present invention.
Figure 6:
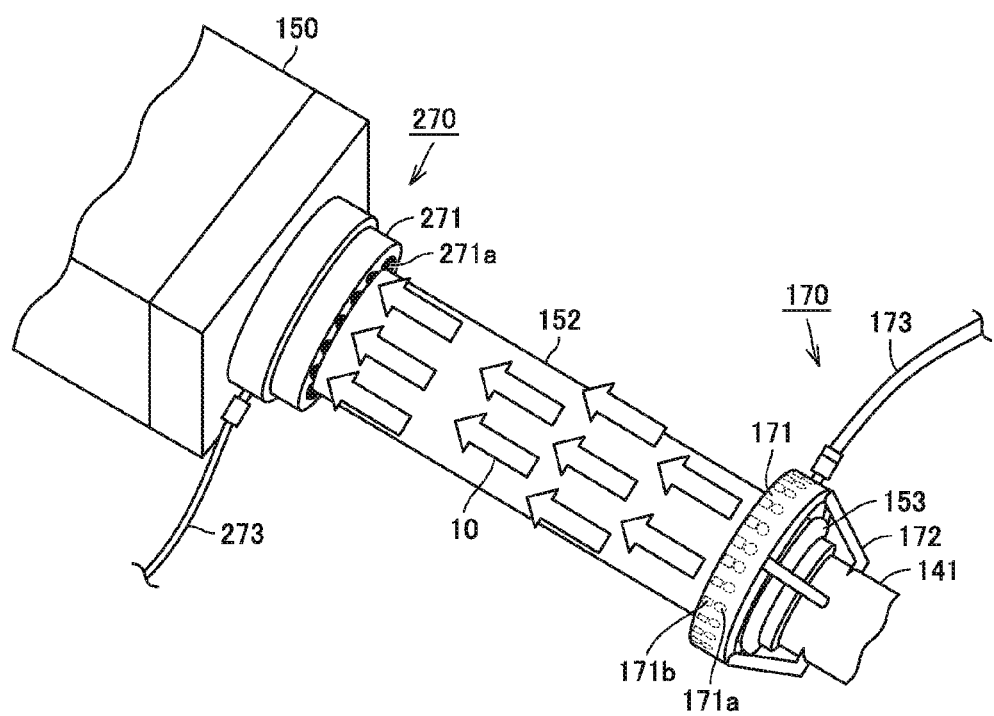
FIG. 6 is a perspective view showing the configuration of the gas spraying structure in the impulse voltage generating device according to the second embodiment of the present invention.

FIG. 5 is a partial cross sectional view showing a configuration of a gas spraying structure in the impulse voltage generating device according to the second embodiment of the present invention. FIG. 6 is a perspective view showing the configuration of the gas spraying structure in the impulse voltage generating device according to the present embodiment. In FIG. 5, only gas spraying unit 171 and a suctioning unit 271 described below are shown in across section.

As shown in FIG. 5 and FIG. 6, impulse voltage generating device 200 according to the second embodiment of the present invention includes: a suctioning structure 270 disposed such that bushing 152 is positioned between suctioning structure 270 and gas spraying structure 170, suctioning structure 270 being configured to guide the insulation gas sprayed by gas spraying structure 170 to flow along the outer surface of bushing 152 as indicated by arrows 10.

Suctioning structure 270 includes annular suctioning unit 271. Suctioning unit 271 is positioned to surround the circumference of a root portion of bushing 152. Specifically, suctioning unit 271 made of a metal is fixed to a side surface of metal container 150.

Suctioning unit 271 has a plurality of suctioning openings 271a provided across the entire circumference of a surface of suctioning unit 271 at a side facing gas spraying structure 170. Moreover, an insulation pipe 273 for suctioning a gas from suctioning openings 271a is connected to suctioning unit 271. Suctioning unit 271 suctions gas at a flow rate controlled by a compressor (not shown) connected to insulation pipe 273.

In impulse voltage generating device 200 according to the present embodiment, by operating suctioning structure 270, the insulation gas sprayed by gas spraying structure 170 can be guided to flow along the outer surface of bushing 152 as indicated by arrows 10. Accordingly, the insulation gas is effectively sprayed to the outer surface of bushing 152, whereby time and amount of insulation gas both required to evaporate dew formed on the outer surface of bushing 152 can be reduced as compared with impulse voltage generating device 100 according to the first embodiment.

Moreover, in impulse voltage generating device 200 according to the present embodiment, water vapor produced by the evaporation of dew formed on the outer surface of bushing 152 can be suctioned by suctioning structure 270 and can be exhausted to outside of impulse voltage generating device 200. Hence, as compared with impulse voltage generating device 100 according to the first embodiment, inappropriate external discharging can be more securely prevented from occurring due to dew formed on the outer surface of bushing 152.

It should be noted that the embodiments disclosed herein are illustrative in any respect and does not provide grounds for restrictive interpretation. Therefore, the technical scope of the present invention should not be interpreted only in accordance with the above-described embodiments and is defined based on the description of claims. Moreover, the technical scope of the present invention includes any modification having meaning and scope equivalent to those in the scope of claims.

REFERENCE SIGNS LIST 100, 200: impulse voltage generating device; 110: trigger electrode; 111: DC power source; 120: starting gap switch; 121: starting bulb; 122, 161, 162: discharging bulb; 130: series resistor; 140: parallel resistor; 141: connection conductor; 150: metal container; 151: capacitor; 152: bushing; 153: electric field relaxation shield; 160: discharging gap switch; 170: gas spraying structure; 171: gas spraying unit; 171a, 171b: gas spraying opening; 172: supporting unit; 173, 273: insulation pipe; 174: heating unit; 180: insulation cylinder; 181: blower structure; 190: test specimen; 270: suctioning structure; 271: suctioning unit; 271a: suctioning opening; A: creepage surface portion.

The invention claimed is:

1. An impulse voltage generating device comprising:
an insulation cylinder;
a DC power source positioned outside the insulation cylinder;

a plurality of capacitors arranged successively and connected to the DC power source in parallel, the capacitors being provided in a plurality of stages, the capacitors being accommodated in metal containers positioned outside the insulation cylinder;

a discharging gap switch positioned in the insulation cylinder and provided between the plurality of stages;

a blower structure configured to cause an insulation gas to flow in the insulation cylinder;

a bushing for each of the capacitors, the bushing being positioned outside the insulation cylinder;

a gas spraying structure positioned outside the insulation cylinder, the gas spraying structure being configured to spray the insulation gas to the bushing; and a suctioning structure disposed such that the bushing is positioned between the suctioning structure and the gas spraying structure, the suctioning structure being configured to guide the insulation gas sprayed by the gas spraying structure to flow along an outer surface of bushing.

2. The impulse voltage generating device according to claim 1, wherein the gas spraying structure includes a heating unit configured to heat the insulation gas before spraying the insulation gas.

3. The impulse voltage generating device according to claim 1, wherein the gas spraying structure includes an annular gas spraying unit, and the gas spraying unit is positioned to surround a circumference of a tip portion of the bushing.

4. The impulse voltage generating device according to claim 3, wherein the gas spraying unit has a gas spraying opening provided across an entire inner circumference of the gas spraying unit.

* * * * *